Patented June 15, 1948

2,443,479

UNITED STATES PATENT OFFICE 2,443,479

RECOVERY OF PURE BETA-PICOLINE

George Riethof, Mount Lebanon, Pa., assignor to Pittsburgh Coke & Chemical Company, a corporation of Pennsylvania No Drawing. Application August 20, 1942, Serial No. 455,477

7 Claims. (Cl. 260—290)

This invention relates to the recovery of pure beta-picoline; and it is particularly concerned with the method of recovering beta-picoline substantially free from gamma-picoline and other basic oils, from mixtures of basic oils containing beta and gamma-picoline, said process comprising heating said mixture of basic oils with phthalic anhydride in the presence of acetic anhydride until the basic oils, other than beta-picoline, have condensed with said phthalic anhydride leaving the beta-picoline unchanged, and separating said condensation products from the uncombined beta-picoline; and it further comprises a process wherein the basic oil mixture is preliminarily treated to effect removal of 2,6-lutidine by reacting the 2,6-lutidine with urea and separating the reaction product from the basic oil mixture, whereby substantial economy of phthalic anhydride may be effected in the subsequent recovery of beta-picoline; and it further comprises a process of producing pyrophthalones by condensing methyl-substituted pyridines, other than beta-picoline, with phthalic anhydride in the presence of acetic anhydride; all as more fully hereinafter set forth and as claimed.

One of the principal natural sources of beta-picoline is the basic coal tar oils in which it occurs in admixture with its isomers, alpha- and gamma-picoline, and its homologues, the lutidines. These basic oils can be fractionated to produce cuts rich in beta-picoline, but it is not practicable by simple distillation to separate beta-picoline from gamma-picoline and from 2,6-lutidine because all three of these basic oils boil at about 142° C. The product sold commercially as technical beta-picoline often contains fifty per cent or more of other basic oils, being perhaps seventy per cent beta- and gamma-picoline and the remainder mainly 2,6-lutidine.

Pure beta-picoline is not available commercially although beta-picoline of sufficient purity to produce, on oxidation, nicotinic acid having a melting point of about 232° C. is in demand for the production of nicotinic acid and nicotinic acid compounds for fortifying the vitamin content of foods. The specification of the melting point of the nicotinic acid formed on oxidation of beta-picoline is a valuable and accurate measure of the quality of beta-picoline, because it has been found that gamma-picoline, when present even in very small amounts in the beta-picoline, will depress the melting point of the oxidation product to 215° C., or less. Thus, by selection of beta-picoline, which on oxidation yields nicotinic acid having a melting point of 232° C. or higher, a material of high purity, and particularly a material substantially completely free of gamma-picoline, is assured.

It is an object achieved by the present invention to provide a process whereby beta-picoline of such purity that on oxidation it will produce nicotinic acid having a melting point above about 232° C. and as high as 235° to 237° C. may be recovered from mixtures of beta-picoline with other basic coal tar oils, particularly gamma-picoline and 2,6-lutidine. By the term "pure beta-picoline," as used herein and in the appended claims, I mean beta-picoline which on oxidation yields nicotinic acid having a melting point of at least 232° C.

I have discovered that when the reaction between a methyl-substituted pyridine in which the methyl group is in the alpha or gamma position with phthalic anhydride in the presence of acetic anhydride, is carried out in the presence of a tertiary amine which does not react with phthalic anhydride, the amine acts to catalyze the reaction so that the condensation of the alpha or gamma methyl-substituted pyridine with the phthalic anhydride proceeds to completion and all, or substantially all, of the alpha or gamma methyl-substituted pyridine present is converted to a pyro-phthalone. By application of this discovery to basic coal tar oils, I have found that a pure beta-picoline can be recovered from such oils containing beta-picoline in admixture with alpha or gamma-picoline, or both, and with 2,6-lutidine.

I have found that on heating a mixture of basic coal tar oils containing beta-picoline, particularly a mixture of beta-picoline with gamma-picoline, or 2,6-lutidine, or both, with phthalic anhydride in the presence of acetic anhydride, the beta-picoline, a tertiary amine which does not react with phthalic anhydride, acts as a catalyst and a reaction can be effected between the phthalic anhydride and all of the gamma-picoline, as well as with substantially all of the 2,6-lutidine, to form compounds such as the pyrophthalones while the beta-picoline remains unchanged. The beta-picoline is readily separable from these reaction products by distillation. By this process substantially complete separation of the beta-picoline from gamma-picoline and 2,6-lutidine, can be effected, and the beta-picoline recovered is of sufficiently high purity to produce on oxidation nicotinic acid having a melting point above about 232° C., usually between 235° and 237° C.

In carrying out the process of my invention when beta-picoline is to be recovered from a mixture of basic tar oils containing relatively large amounts of 2,6-lutidine, it is often desirable to effect a preliminary separation of 2,6-lutidine. While my process is effective to recover pure beta-picoline from admixture with 2,6-lutidine, it is sometimes more economical to effect a preliminary separation of some of the 2,6-lutidine. Also, a pure beta-picoline can be recovered in somewhat better yield by my process from a mixture containing a relatively small amount of 2,6-lutidine than from one containing a relatively large amount.

Such preliminary separation of 2,6-lutidine can be effected by the process of my copending United States patent application Serial No. 404,932, filed July 31, 1941, now Patent No. 2,295,606, issued September 15, 1942. The method therein described comprises treating a mixture of basic tar oils containing 2,6-lutidine with urea. The urea reacts with the 2,6-lutidine to form a crystalline compound which separates out of the solution. A mixture of beta- and gamma-picoline thus separated from 2,6-lutidine may advantageously be treated according to the present invention for the recovery of pure beta-picoline.

The process of my invention is usually carried out by mixing the crude basic oil mixture containing the beta-picoline to be recovered with an amount of acetic anhydride and phthalic anhydride, each equal to or slightly greater than the theoretical amount required to combine with all of the gamma-picoline and 2,6-lutidine present in the crude basic oil mixture. Somewhat smaller amounts of phthalic anhydride may be used if desired. The mixture of basic oils, acetic anhydride and phthalic anhydride, is heated to a temperature between 130° and 200° C., advantageously between 160° and 180 C. for a time sufficient to effect substantially complete reaction between the gamma picoline and the 2,6-lutidine present with the phthalic anhydride. For this purpose I have found that by heating at a temperature of about 170° C. for about 5 hours is usually adequate.

As the reaction proceeds a dark oil is formed containing unchanged beta-picoline and the reaction products and excess reagents. Upon distillation of this oil, beta-picoline mixed with acetic acid can be separated. This mixture may be neutralized with caustic soda and again distilled to separate the beta-picoline from the acetic acid. In such case, the acetic acid is not recovered. It is usually preferable therefore to treat this mixture with sulfuric acid to convert the beta-picoline to its acid sulfate and distill out and recover the acetic acid. The remaining beta-picoline acid sulfate upon neutralization, for example, with caustic soda and re-distillation and drying, yields a pure beta-picoline completely free of gamma-picoline and free or substantially free of 2,6-lutidine. The pure beta-picoline thus recovered upon oxidation yields nicotinic acid having a melting point above about 236° C., usually 235° to 237° C.

The following example illustrates the results obtained by a method of my invention:

In this example pure beta-picoline was recovered from a mixture of basic tar oils containing about 40 per cent by weight of beta-picoline, 45 per cent by weight of gamma-picoline and 15 per cent by weight of 2,6-lutidine. This basic oil mixture was obtained by treating a crude commercial picoline cut with urea, according to the process of my copending application Serial No. 404,932, to effect a preliminary separation of a part of the 2,6-lutidine.

To 300 parts by weight of the picoline mixture there were added 460 parts by weight of phthalic anhydride, 300 parts by weight of acetic anhydride. The mixture was heated to 170° and maintained at 170° to 175° C. for 5½ hours until the reaction was substantially complete. The reaction mixture was then distilled off to a temperature of 155° C. The distillate was then neutralized with excess caustic soda and the pure beta-picoline was distilled off. The sample of the beta-picoline thus recovered was oxidized to nicotinic acid by the method described by Pinner in Berichte, vol. 33, page 1226 (1900), with the exception that the nicotinic acid was not purified but was tested in the form in which it crystallized from the aqueous solution. The resulting nicotinic acid had a melting point of 236° to 237.4° C.

While my invention has been defined herein with respect to certain specific embodiments thereof, it is to be understood that it is not limited to such embodiments or details thereof, except as hereinafter defined in the appended claims.

What I claim is:

1. A process of recovering pure beta-picoline from basic oil mixtures containing appreciable amounts of beta and gamma-picoline, comprising combining gamma-picoline with phthalic anhydride by heating the basic oil mixture with said phthalic anhydride at a temperature of 130° to 200° C., in the presence of acetic anhydride, and thereafter separating the unchanged beta-picoline from the reaction mixture.

2. A process of recovering pure beta-picoline from basic oil mixtures containing appreciable amounts of beta and gamma-picoline and 2,6-lutidine, comprising combining the gamma picoline and 2,6-lutidine with phthalic anhydride by heating the basic oil mixture with said phthalic anhydride at a temperature of 130° to 200° C. in the presence of acetic anhydride, and thereafter separating unchanged beta-picoline from the reaction mixture.

3. A process of recovering pure beta-picoline from basic oil mixtures containing appreciable amounts of beta and gamma-picoline and 2,6-lutidine comprising combining the gamma-picoline and 2,6-lutidine with phthalic anhydride by heating the basic oil mixture with said phthalic anhydride at a temperature of 130° to 200° C. in the presence of acetic anhydride, and thereafter distilling off unchanged beta-picoline from the reaction mixture.

4. A process of recovering pure beta-picoline from mixtures of basic oils containing appreciable amounts of beta and gamma-picoline and 2,6-lutidine, comprising reacting the 2,6-lutidine with urea and separating the crystalline compound thus formed from the remaining basic oils, combining the gamma-picoline and any remaining 2,6-lutidine with phthalic anhydride by heating the remaining basic oils with phthalic anhydride in the presence of acetic anhydride at a temperature of 130° to 200° C. and thereafter distilling off the unchanged beta-picoline from the reaction mixture.

5. A process of recovering pure beta-picoline from basic oil mixtures containing appreciable amounts of beta and gamma-picolines and 2,6-lutidine, comprising combining gamma-picoline and 2,6-lutidine with phthalic anhydride by heating the basic oil mixture with said phthalic anhydride at a temperature of 160° to 180° C. in the presence of acetic anhydride and thereafter distilling off the unchanged beta-picoline from the reaction mixture.

6. A process of recovering pure beta-picoline from basic oil mixtures containing appreciable amounts of beta and gamma-picoline and 2,6-lutidine, comprising combining the gamma-picoline and 2,6-lutidine with phthalic anhydride by heating the basic oil mixture with said phthalic anhydride at a temperature of 160° to 180° C. in the presence of acetic anhydride and thereafter distilling off the unchanged beta-picoline and acetic acid, treating the distillate with sufficient sulfuric acid to convert the beta-picoline to its acid sulfate, distilling off acetic acid and other impurities from the solution of beta-picoline acid sulfate, neutralizing the remaining solution with alkali and distilling off and recovering pure beta-picoline.

7. A process of recovering pure beta-picoline from basic oil mixtures containing appreciable amounts of beta and gamma-picoline and 2,6-lutidine, comprising combining the gamma-picoline and 2,6-lutidine with phthalic anhydride by heating the basic oil mixture with phthalic anhydride at a temperature of 160° to 180° C. in the presence of acetic anhydride and thereafter distilling off the unchanged beta-picoline and acetic acid from the pyrophthalone condensation product, neutralizing the distillate with alkali and distilling off and recovering pure beta-picoline.

GEORGE RIETHOF.

REFERENCES CITED

The following references are of record in the file of this patent:

UNITED STATES PATENTS

| Number | Name | Date |
| --- | --- | --- |
| 2,295,606 | Riethof | Sept. 15, 1942 |

OTHER REFERENCES

Berichte de Deut. Gesell., vol. 32; pp. 1889 and 2526–7; ibid., vol. 21; pp. 1007–10.

J. Chem. Soc. 1933; pp. 77–79.

Maier: Das Pyridin und seine Derivate, pp. 31, 32, 35, 46–49, 54 and 59.